United States Patent [19]

Franks

[11] Patent Number: 4,986,914

[45] Date of Patent: Jan. 22, 1991

[54] FILTER FOR PROTINACEOUS MATERIALS

[75] Inventor: Joseph Franks, Middlesex, England

[73] Assignee: Ion Tech Limited, Middlesex, England

[21] Appl. No.: 389,587

[22] Filed: Aug. 4, 1989

[30] Foreign Application Priority Data

Aug. 4, 1988 [GB] United Kingdom ............... 8818529
Aug. 15, 1988 [GB] United Kingdom ............... 8819395

[51] Int. Cl.⁵ .................................................. B01D 39/14
[52] U.S. Cl. .............................. 210/502.1; 210/506; 210/510.1
[58] Field of Search ................... 210/502.1, 503–509, 210/510.1

[56] References Cited

U.S. PATENT DOCUMENTS

| 3,901,808 | 8/1975 | Bokros | 210/506 |
| 3,972,818 | 8/1976 | Bokros | 210/505 |
| 4,425,144 | 1/1984 | Casperson | 55/96 |
| 4,500,328 | 2/1985 | Brassell et al. | 55/97 |
| 4,663,183 | 5/1987 | Ovshinsky et al. | 427/39 |
| 4,725,355 | 2/1988 | Yamamoto et al. | 210/506 |

FOREIGN PATENT DOCUMENTS

| 8943 | 9/1979 | European Pat. Off. |
| 1-103310 | 4/1989 | Japan . |
| 558883 | 1/1944 | United Kingdom . |

Primary Examiner—Ivars Cintins
Attorney, Agent, or Firm—Lowe, Price, LeBlanc, Becker & Shur

[57] ABSTRACT

A filter is made from a special form of carbon, selected from the group of diamond-like carbon, pyrolitic carbon, glassy carbon and turbostratic carbon. The special carbon may be on a substrate, for example of polymeric material or a ceramic.

7 Claims, 1 Drawing Sheet

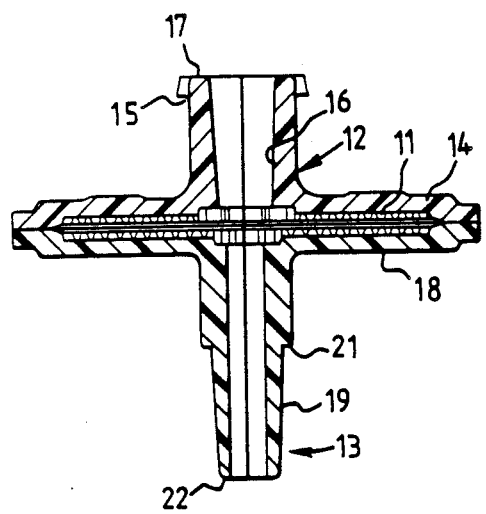

FILTER FOR PROTINACEOUS MATERIALS

TECHNICAL FIELD

This invention relates to a filter body. Such a body is usually replaceable, so that new body can be replaced in a filter body housing when the original body has become too clogged for further use, even after cleaing. The housing itself may be disposable with the body, if desired.

BACKGROUND ART

Filter bodies may contain in a variety of configurations including a sieve or mats of fibres laid one over the other. The filter body removes particles from carrier fluid which are too large to pass through the apertures in the filter body. Smaller particles can be removed from the carrier fluid if some mechanism is provided for restraining them other than by physical obstruction. The present invention provides this mechanism for particles of protinaceous material.

It has been proposed to coat filter bodies with collagen, or to treat them by spark erosion, to provide a protein attracting surface, but these processes are expensive.

DISCLOSURE OF THE INVENTION

It is accordingly one object of the present invention to provide for a filter body.

It is another object of the present invention to provide for a filter body for removing protinaceous materials from fluids.

It is a further object of the present invention to provide a filter body which comprises a carbon selected from the group consisting of diamond-like carbon, pyrolitic carbon, glassy carbon and turbostratic carbon.

BRIEF DESCRIPTION OF THE DRAWING

Aspects of the present invention will be described with reference to the annexed drawing, which is given by way of a non-limiting example and schematically illustrates a cross sectional view of the filter body according to one embodiment of the present invention.

BEST MODE OF THE CARRYING OUT THE INVENTION

According to the present invention there is provided a filter body comprising a form of carbon, selected from the group of diamond-like carbon, pyrolitic carbon, glassy carbon and turbostratic carbon. The filter body may comprise members of said form of carbon or of a conventional material such as polymers, ceramics or other materials coated with said form of carbon. Although these forms of carbon have other applications, their use in filter bodies specifically for the removal of protinaceous material by adhesion has not been previously suggested. We have found that their use in filter bodies improves the filtering efficiency, because to prevent the passage of particles of a given cross section, the cross section of the apertures in a filter body can be increased and hence the rate of flow of the fluid to be filtered can also be increased if the particles to be removed are removed not only by physical obstruction but also by a physical adhesion to the filter body. We have found that the carbons of the group specified attract protinaceous materials more readily than materials conventionally used for construction of filter bodies and so more readily remove those materials from the carrier fluid even if the apertures of the filter body are somewhat larger than the cross section of the particles. Diamond-like carbon is specially good in this respect.

An example of the invention will now be described with reference to the accompanying drawing which is an axial section through a disposable filter body.

The body is a figure of revolution about an axis, material which performs the filtering function being a porous disc 11 mounted between an inlet 12 and an outlet 13. The disc 11 has a substrate of polymeric material coated with diamond-like carbon. Diamond-like carbon is a special form of carbon whose composition is defined in the literature. Other forms of carbon may be used, selected from pyrolytic carbon, glassy carbon and turbostratic carbon, but diamond-like carbon is preferred. A ceramic subtrate may be used. The substrate may be dispensed with, the filter disc being formed out of one of the specified carbons.

The inlet 12 is a plastics moulding having a base part 14 adapted to receive the filter disc 11 and an upper part 15 formed as a female Luer-Lock inlet, having a tapered bore 16 of specified length extending from the top surface 17 of the body. The outlet 13 is a similar plastic moulding having a top part 18 which co-operates with the base part 14 of the inlet to receive the filter disc 11 and an outlet part 19 formed as a male Luer-Slip. The outer surface of there outlet part has a shoulder 21 which is spaced from the bottom surface 22 of the body by the same specified length as that of the inlet part. The parts 14 and 18 are of about 2.5 cm (one inch) diameter.

The filter body is conventional except for the constitution of the disc 11. The disc 11 is a uniform polymer coated control with the diamond-like carbon - so that the carbon is uniformly distributed across the disc. Alternatively the disc could comprise a perforated substrate suitably coated, or a mesh substrate suitable coated. Another alternative is for the substrate and coating to be replaced by an integral body of the carbon itself, in any of the arrangements described in this paragraph.

Material to be filtered is injected into the filter body inlet 12 by a syringe which has an outlet formed as a male Lue-Slip. The material is diverted at the disc axis across the top surface of the disc 11 and flows through the disc and back to the disc axis, leaving the body through the outlet 13, to a collection conduit not illustrated having a female Luer-Lock inlet.

When the filter becomes clogged, the filter body illustrated can be unplugged from the syringe and collection conduit and a new one substituted.

Although one form of filter body has been described and illustrated, the filter materials specified according to the invention can be used in any filter body.

We claim:

1. A filter body comprising a porous unitary element having on an outer surface thereof means for selectively removing, by adhesion, protinaceous materials from fluids passed through said porous unitary element, wherein said means for selectively removing protinaceous materials comprises a carbon selected from the group consisting of diamond-like carbon, glassy carbon and turbostratic carbon.

2. A filter body according to claim 1, wherein said carbon comprises a coating on said porous unitary element.

3. A filter body according to claim 2, wherein said carbon layer is uniformly distributed on said porous unitary element.

4. A filter body according to claim 2, wherein said porous unitary elements is made from a polymeric material.

5. A filter body according to claim 1, wherein said porous unitary element comprises a ceramic material.

6. A filter body according to claim 1, wherein said porous unitary element comprises carbon.

7. A filter body according to claim 1, wherein said porous unitary element comprises a perforated substrate.

* * * * *